(No Model.)

R. CAMERON.
VEHICLE SEAT LOCK.

No. 390,838. Patented Oct. 9, 1888.

WITNESSES.
T. W. Fowler,
W. H. Patterson.

INVENTOR,
Robert Cameron,
by A. H. Evans & Co.
Attorneys.

United States Patent Office.

ROBERT CAMERON, OF BERNALILLO, TERRITORY OF NEW MEXICO.

VEHICLE-SEAT LOCK.

SPECIFICATION forming part of Letters Patent No. 390,838, dated October 9, 1888.

Application filed July 17, 1888. Serial No. 280,176. (No model.)

*To all whom it may concern:*

Be it known that I, ROBERT CAMERON, a citizen of the United States, residing at Bernalillo, in the county of Bernalillo and Territory of New Mexico, have invented certain new and useful Improvements in Locking Devices, of which the following is a full and clear description, reference being had to the accompanying drawings, forming part of this specification, in which—

Figure 1:
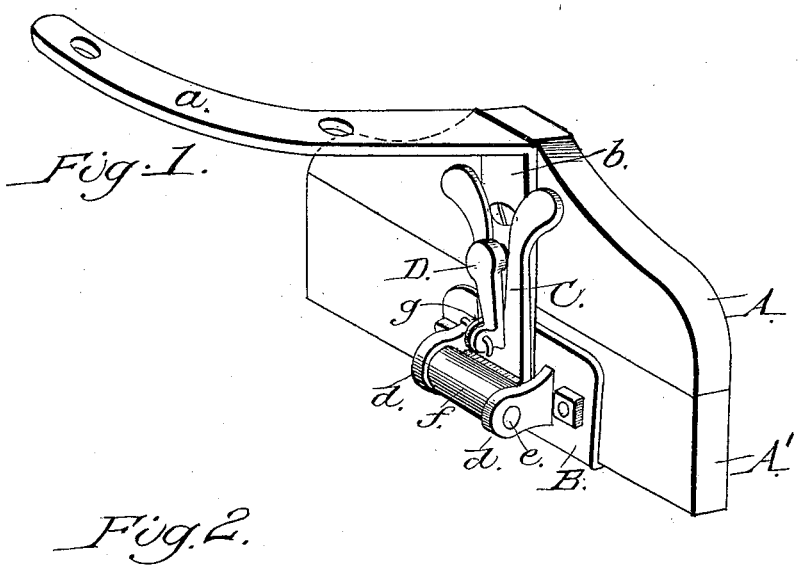
Figures 2, 3:
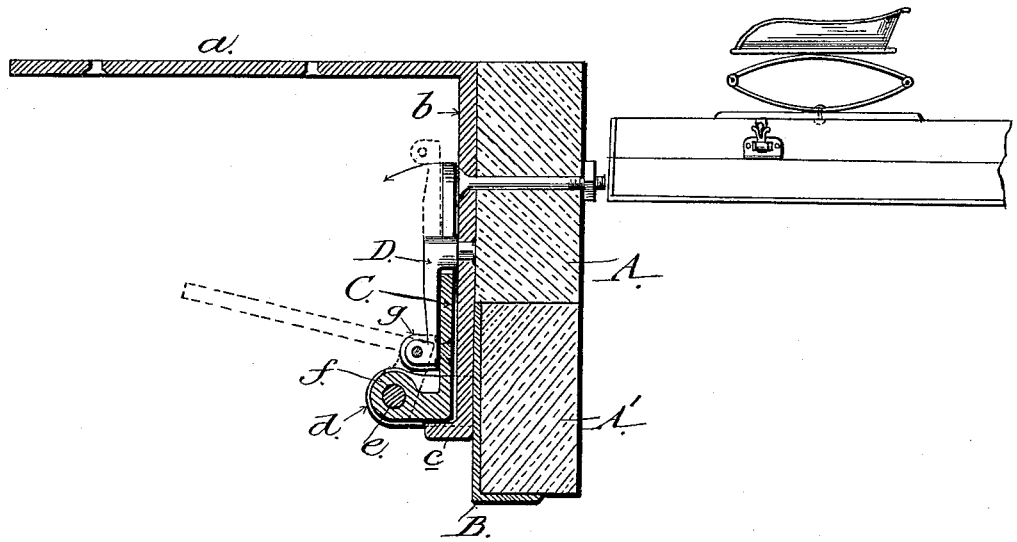

Figure 1 represents a perspective view of a locking device for securing two meeting surfaces together. Fig. 2 is a sectional view of the same. Fig. 3 shows the application of my invention to a wagon.

My invention relates to certain devices adapted for locking two meeting sections securely together, and is especially applicable as a seat-lock for vehicles for securing gates, sliding doors, &c., boxes of wheelbarrows to the body portion, securing trace-fasteners, &c.; and my invention consists in the constructions and combinations of devices which I shall hereinafter fully describe and claim.

To enable others skilled in the art to make and use my invention, I will now describe the same and indicate the manner in which I carry it out.

In the said drawings, A represents one of the meeting sections, and A' the other section, to which the first section is secured by the locking devices hereinafter mentioned, said sections representing, respectively, the fixed or body portion and the movable portion of the article or device to be secured.

The fixed section A may be provided with one or more castings or arms, a, by which it is secured to the body of the wagon, wheelbarrow, or other article, and said casting has an arm, b, secured to the section A, and provided at its end with a projecting lug, c, as shown in Fig. 2. The other section, A', has bolted to it a casting or plate, B, provided with two projecting lugs, d, through which a bolt or pin, e, is passed, and upon this pin or bolt a locking plate or lever, C, is mounted, the said locking-plate having at one end an eye, f, through which the bolt e may be passed to secure the locking-plate between the lugs d, and also permit of its having a free swinging movement thereon. The plate C has its outer or free end forked, as shown in Fig. 1, and its rear wall is arranged at an approximately right angle with the main portion of the plate, thereby adapting the sharp corner thus formed for the close engagement with the projecting lug c on the arm b of casting or arm a, as shown more particularly in Fig. 2.

The arm b of the casting a has swiveled or otherwise loosely journaled thereto a lever, D, which is separated from the face of the arm a by its pivot or axis a sufficient distance to permit the introduction between the lever and the arm a of the forked end of the locking lever or plate C, the said plate carrying also a swiveled stud, g, by means of which and a pin or wire passed through holes in the lug g and the outer end of the lever D the said lever may be secured to the lug, thereby firmly uniting the movable section A' with its adjacent fixed section A.

In operating my invention the portion of arm b which carries the lug c, and which projects beyond the section A' a short distance, is passed into the space formed between the lugs d on the plate B, and between the eye portion f and body of the plate, the locking-plate C being thrown back to permit the ready insertion of the arm b. When the parts are thus in position, the locking-plate C is brought against the face of the arm b, thus bringing the angled shoulder of said plate squarely against the lug c, thereby forming a secure seat for said lug.

The lever D, which lies in the forked end of the plate C, is now turned to one side, so as to confine the plate between itself and the arm b of the casting a, and is secured to the stud g on the locking-lever D, thereby securely uniting said lever C with the lever D and securing the two sections A A' firmly together.

The releasing of said sections is readily accomplished by disconnecting the levers C and D and throwing the former lever outward, and then moving the section A' out of its engagement with the fixed section A.

Having thus described my invention, what I claim as new, and desire to secure by Letters Patent, is—

1. The section A, having the arm b, with the projecting lug c and the swiveled lever D, in combination with the section A', having the pivoted locking-plate secured thereto, said plate having a forked end adapted to receive the swiveled lever, whereby said plate is secured between the lever and the arm $a$, and the two meeting sections united, substantially as described.

2. The section A, having the arm $b$, provided with the lug $c$ and the swiveled lever D, in combination with the section A', having the plate or casting B, provided with the lugs $d$, the bolt or pin passing between said lugs, and the locking-lever mounted on said bolt, said lever having an angled portion, against which the lug $c$ abuts, a forked end, into which the lever D is passed, and a swiveled stud, to which said lever D is secured, whereby the sections A and A' are detachably secured, substantially as described.

ROBERT CAMERON.

Witnesses:
W. H. FERRIS,
LOUIS LABRAN PEREA.